(12) United States Patent
Weiss

(10) Patent No.: US 6,523,020 B1
(45) Date of Patent: Feb. 18, 2003

(54) LIGHTWEIGHT RULE INDUCTION

(75) Inventor: Sholom Weiss, Highland Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,323

(22) Filed: Mar. 22, 2000

(51) Int. Cl.[7] .............................. G06N 5/02; G06F 7/00; G06F 17/30
(52) U.S. Cl. ............................................. 706/47; 707/5
(58) Field of Search ............................... 706/47; 707/2, 707/3, 5

(56) References Cited

U.S. PATENT DOCUMENTS

| | | | |
|---|---|---|---|
| 5,592,590 A | * 1/1997 | Jolly | 706/59 |
| 5,719,692 A | 2/1998 | Cohen | 706/47 |
| 5,960,422 A | * 9/1999 | Prasad | 706/47 |
| 6,003,029 A | * 12/1999 | Agrawal et al. | 707/1 |
| 6,061,682 A | * 5/2000 | Agrawal et al. | 707/1 |
| 6,418,432 B1 | * 7/2002 | Cohen et al. | 707/5 |

OTHER PUBLICATIONS

Apte et al.; "Automated Learning of Decision Rules of Text Categorization". ACM Transactions on Infornation Systems, Jul., 1994, pp. 233–240.*

Zhou et al.; "Probabilistic Induction of Decision Trees and Disjunctive Normal Forms". Proceedures of the 1993 IEEE International Conference on Tools with AI, Nov. 1993, pp. 140–144.*

Sasisekharan et al.; "Using Machine Learning to Monitor Network Performance". Proceedings of the 10th Conference on AI for Applications, Mar. 1994, pp. 92–98.*

Apte et al.; "RAMP: Rules Abstraction for Modeling and Prediction". IBM Research Division Technical Report RC–20271, Jan. 1996, pp. 1–14.*

(List continued on next page.)

Primary Examiner—Thomas Black
Assistant Examiner—Kelvin Booker
(74) Attorney, Agent, or Firm—Whitham, Curtis & Christofferson, P.C.; Stephen C. Kaufman

(57) ABSTRACT

A lightweight rule induction method is described that generates compact Disjunctive Normal Form (DNF) rules. Each class may have an equal number of unweighted rules. A new example is classified by applying all rules and assigning the example to the class with the most satisfied rules. The induction method attempts to minimize the training error with no pruning. An overall design is specified by setting limits on the size and number of rules. During training, cases are adaptively weighted using a simple cumulative error method. The induction method is nearly linear in time relative to an increase in the number of induced rules or the number of cases. Experimental results on large benchmark datasets demonstrate that predictive performance can rival the best reported results in the literature.

15 Claims, 4 Drawing Sheets

OTHER PUBLICATIONS

Weiss et al.; "Rule –based Machine Learning Methods for Functional Prediction". Journal of AI Research, vol. 3, Dec. 1995, pp. 383–403.*

Weiss et al.; "Rule–based Diagnostic Decision Aids for Common Eye Problems". IEEE Engineering in Medicine and Biology Society 10$^{th}$ Annual International Conference, vol. 3, Nov. 1988, pp. 1395–1396.*

Liu, H.; "Efficient Rule Induction from Noise Data". Expert Systems with Applications: An International Journal, vol. 10, 1996.*

S. Weiss, et al., "Optimized Rule Induction", *IEEE Expert*, 8(6), pp. 61–69 (Dec. 1993).

W. Cohen, "Fast Effective Rule Induction", *The XII International Conference on Machine Learning*, pp. 115–123 (1995).

W. Cohen et al., "A Simple, Fast, and Effective Rule Learner", *Proceedings of Annual Conference of American Association for Artificial Intelligence*, pp. 335–342 (1999).

R. Schapire, "A Brief Introduction to Boosting", *Proceedings of International Joint Conference on Artificial Intelligence*, pp. 1401–1405 (1999).

J. Friedman et al., "Additive Logistic Regression: A Statistical View of Boosting", Technical Report, Stanford University Statistics Department (Jul. 1998).

L. Breiman, "Bagging Predictors", *Machine Learning*, 24, pp. 123–140 (Sep. 1994).

S. Weiss et al., "Maximizing Text–mining Performance", *IEEE Intelligent Systems*, 14(4), pp. 63–69 (Jul. 1999).

E. Bauer et al., "An Empirical Comparison of Voting Classification Algorithms: Bagging, Boosting and Variants", *Machine Learning Journal*, 36(1), pp. 105–139 (Sep. 1998).

T. Dietterich, "An Experimental Comparison of Three Methods for Constructing Ensembles of Decision Trees: Bagging, Boosting and Randomization", *Machine Learning Journal*, 0(0), (1999).

L. Breiman, "Bias, Variance and Arcing Classifiers", Technical Report 460, University of California, Berkeley (1996).

R. Schapire et al., "Boosting the Margin: A New Explanation for the Efectiveness of Voting Methods", *The Annuals of Statistics*, 26(5), pp. 1651–1686 (May 1998).

* cited by examiner

LIGHTWEIGHT RULE INDUCTION

BACKGROUND OF THE INVENTION

1. Field of the Invention

The present invention generally relates to decision rules for data mining and, more particularly, to a method that generates Disjunctive Normal Form (DNF) rules using lightweight rule induction. The induction method attempts to minimize classification error.

2. Background Description

Decision trees and decision rules are well-known and related types of classifiers. The terminal nodes of a tree can be grouped into Disjunctive Normal Form (DNF) rules, only one of which is satisfied for a new case. Decision rules are also DNF rules, but allow rules to overlap, which potentially allows for more compact and interesting rule sets.

Decision tree induction methods are more efficient than those for decision rule induction—some methods for decision rule induction actually start with an induced decision tree. Procedures for pruning and optimization are relatively complex (see S. Weiss and N. Indurkhya, "Optimized Rule Induction," IEEE EXPERT, 8(6), pp. 61–69 (1993); and W. Cohen, "Fast Effective Rule Induction," *The XII International Conference on Machine Learning*, pp. 115–123 (1995)). In terms of predictive performance, logic-based methods have difficulty with applications having complex solutions. With lesser support for many of the rules, the induced solutions are often bedeviled by high variance, where the training error is far from the test error.

Single decision trees are often dramatically outperformed by voting methods for multiple decision trees. Such methods produce exaggeratedly complex solutions, but they may be the best obtainable with any classifier. In W. Cohen and Y. Singer, "A Simple, Fast, and Effective Rule Learner," *Proceedings of Annual Conference of American Association for Artificial Intelligence*, pp. 335–342 (1999), boosting techniques, as described in R. Schapire, "A Brief Introduction to Boosting," *Proceedings of International Joint Conference on Artificial Intelligence*, pp. 1401–1405 (1999), are used by a system called SLIPPER to generate a weighted set of rules that are shown to generally outperform standard rule induction techniques. While these rules can maintain clarity of explanation, they do not match the predictive performance of the strongest learning methods, such as boosted trees. Of particular interest to the present invention is J. Friedman, T. Hastie and R. Tibshirani, "Additive Logistic Regression: A Statistical View of Boosting," Technical Report, Stanford University Statistics Department (1998) where very small trees are boosted to high predictive performance by truncated tree induction (TTI). Small trees can be decomposed into a collection of interpretable rules. Some of the boosted collections of tiny trees, even tree stumps, have actually performed best on benchmark applications.

SUMMARY OF THE INVENTION

It is therefore an object of the invention to provide a lightweight rule induction method that generates compact Disjunctive Normal Form (DNF) rules.

According to the invention, each class may have an equal number of unweighted rules. A new example is classified by applying all rules and assigning the example to the class with the most satisfied rules. The induction method attempts to minimize the training error with no pruning. An overall design is specified by setting limits on the size and number of rules. During training, cases are adaptively weighted using a simple cumulative error method. The induction method is nearly linear in time relative to an increase in the number of induced rules or the number of cases. Experimental results on large benchmark datasets demonstrate that predictive performance can rival the best reported results in the literature.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
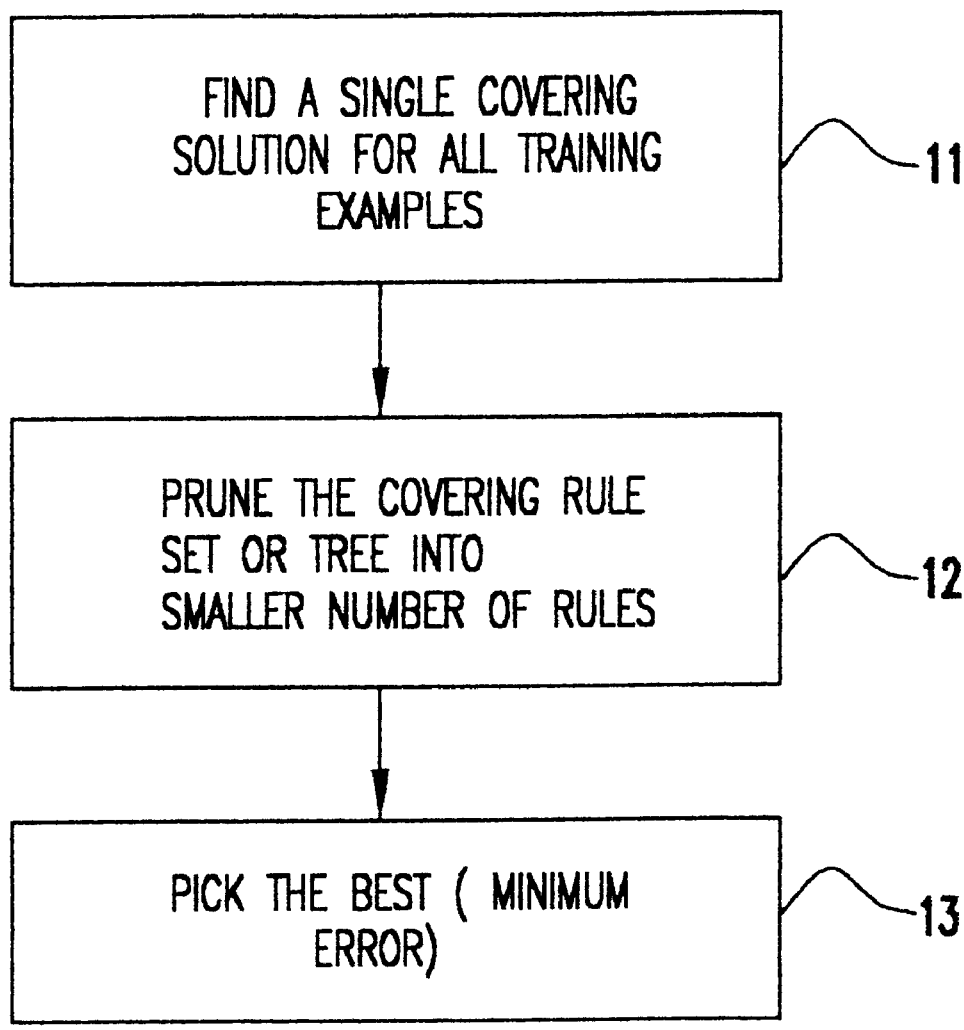
FIG. 1 is a flow diagram of the classical approach to rule induction.

Referring now to the drawings, and more particularly to FIG. 1, the classical approach to rule induction, (see S. Weiss and N. Indurkhya, "Optimized Rule Induction," IEEE EXPERT, 8(6), pp. 61–69 (1993); and W. Cohen, "Fast Effective Rule Induction," *The XII International Conference on Machine Learning*, pp. 115–123 (1995)), is shown in a three-step process. The first step 11 is to find a single covering solution for all training examples. The covering rule set is found directly by inducing conjunctive rules or indirectly by inducing a decision tree. The direct solution usually involved inducing one rule at a time, removing the cases covered by the rule, and then repeating the process. The second step 12 is to prune the covering rule set or tree into smaller number of rules. The third step 13 is to pick the best minimum error, either by a statistical test or by applying the rule sets to independent test cases.

A pure DNF rule for classification is evaluated as satisfied or not. If satisfied, the rule implies a specific class. The conditions or components of a rule can be tested by applying $\leq$ or $>$ operators to variables and coding categorical values separately as 1 for true and 0 for false.

One can measure the size of a DNF rule with two measurements:

(a) the length of a conjunctive term and the number of terms (disjuncts). For example, $$\{c_1 c_2 c_3\} \text{ OR } \{c_1 c_3 c_4\} \rightarrow \text{Class}$$

is a DNF rule for conditions $c_i$ with maximum length of three and two terms (disjuncts). Complexity of rule sets can be controlled by providing an upper bound on these two measurements.

TABLE 1

Analysis of Error for Binary Classification

|  | Rule-true | Rule-false |
| --- | --- | --- |
| Class-True | True Positive (TP) | False Negative (FN) |
| Class-False | False Positives (FP) | True Negative (TN) |

Table 1 describes the standard analysis of results for binary classification. For evaluation purposes, a rule is applied to each case. Classification error is measured as in Equation 1. For case i, FP(i) is 1 for a false positive, FN(i) is 1 for a false negative, and 0 otherwise.

$$Error = FP + FN; \quad FP = \sum_i FP(i); \quad FN = \sum_i FN(i) \qquad (1)$$

For almost all applications, more than one rule is needed to achieve good predictive performance. In the lightweight approach of the present invention, a solution consists of a set of an equal number of unweighted rules for each class. A new example is classified by picking the class having the most votes, the class with the most satisfied rules. The method is very democratic; each class has an equal number of rules and votes, and each rule is approximately the same size.

The principal remaining task is to describe a method for inducing rules from data. So far a brief description of binary classification has been given. Yet, this form of binary classification is at the heart of the rule induction algorithm. Continue to consider binary classification. The most trivial method for rule induction is to grow a conjunctive term of a rule by the greedy addition of a single condition that minimizes error. To ensure that a term is always added (when error is nonzero) one defines a slightly modified measure, Err1 in Equation 2. Error is computed over candidate conditions where true positive (TP) is greater than zero. If no added condition adds a true positive, the cost of a false negative (FN) error is doubled and the minimum cost solution is found. The cost of a false positive (FP) remains at 1. The minimum Err1 is readily computed during sequential search using the bound of the current best Err1 value.

$$Err1 = FP + (k \cdot FN) \; \{where \; k=1,2,4 \ldots \text{ and } TP>0\} \qquad (2)$$

$$Frq(i) = 1 + e(i)^3 \qquad (3)$$

The lightweight method is adaptive, and follows the well-known principle embodied in boosting: give greater representation to erroneously classified cases. The technique for weighting cases during training is greatly simplified from the usual boosting methods. Analogous to L. Breiman, "Bagging Predictors," *Machine Learning*, 24, pp.123–140 (1996), no weights are used in the induced solution. Weighting of cases during sampling follows a simple method: Let e(i) be the cumulative number of errors for case i for all rules. The cumulative error is computed by applying all prior induced rules and summing the errors for a case. The weighting given to a case during induction is an integer value, representing a relative frequency (frq) of that case in the new sample. Equation 3 is the frequency that is used. It has good empirical support, having had the best reported results on an important text-mining benchmark, S. Weiss, C. Apté and F. Damerau, et al., "Maximizing Text-mining Performance," *IEEE Intelligent Systems*, 14(4), pp. 63–69 (1999), and was first described in S. Weiss and N. Indurkhya, "Predictive Data Mining: A Practical Guide" (Morgan Kaufmann 1998; DMSK Software. Thus, if ten (10) rules have been generated, four (4) of them erroneous on case i, then case i is treated as if it appeared in the sample 65 times (i.e., $\{frq(i) = e(i)^3 = (4 \, errors)^3 + 1\} = 65$). Based on prior experience, alternative functions to Equation 3 may also perform well. Unlike the results of E. Bauer and R. Kohavi, "An Empirical Comparison of Voting Classification Algorithms: Bagging, Boosting and Variants," Machine Learning Journal, 36(1), pp. 105–139 (1999), for the alternative of L. Breiman, "Bagging Predictors, supra, Equation 3 performs well with or without random resampling, and the lightweight rule induction (LRI) algorithm of the present invention uses no random resampling. The computation of FP and FN during training is modified slightly to follow Equation 4.

$$FP = \sum_i FP(i) \cdot frq(i); \quad FN = \sum_i FN(i) \cdot frq(i) \qquad (4)$$

Err1 is computed by simple integer addition. In practice, only 33 different values of e(i), for i=0 to 32 are used. Whenever, the number of cumulative errors exceeds 32, all cumulative errors are normalized by an integer division of 2.

Figure 2:
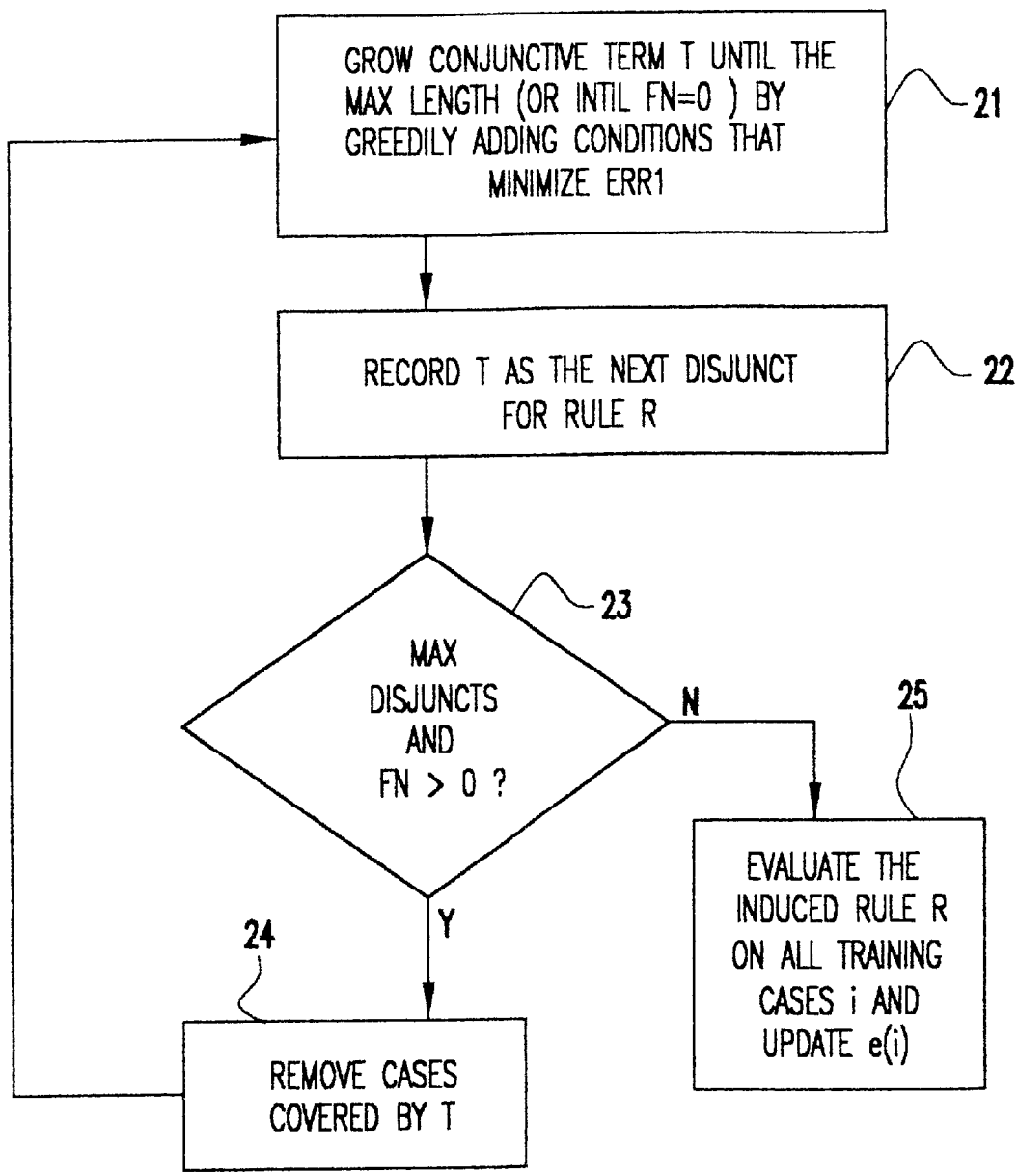
FIG. 2 is a flow diagram for the training algorithm for inducing a DNF rule R, according to the present invention.

The training algorithm of the present invention for inducing a DNF rule R is given in FIG. 2. First the conjunctive term T is grown until the maximum length (or until FN=0) by greedily adding conditions that minimize Err1 in block 21. T is then reported as the next disjunct for rule R in block 22. A determination is made in decision block 23 as to whether the number of disjuncts is less than the maximum AND FN is greater than 0. If so, the cases covered by T are removed in block 24 and processing resumes with block 21. Otherwise, the induced rule R is evaluated on all training cases i and the cumulative number of errors for case i, e(i), is updated in block 25. The algorithm is repeated sequentially for the desired number of rules.

Rules are always induced for binary classification, class versus not-class. A m-class classification problem is handled by mapping it to m binary classification problems—one for each class. Each of the binary classification problems can be computed independently and in parallel. As described later, the equality of voting and rule size, makes the predictive performance of rules induced from multiple binary classification problems quite comparable.

Data Preparation

A very simple pre-processing step dramatically increases the efficiency of rule induction. Each DNF rule is induced from the complete sample and the expectation is that rule size is relative small. To find the best threshold for splitting a variable, substantial time can be expended in sorting the full dataset repeatedly.

Prior to any learning, each variable is sorted only once and produce a paired ordered list of the form $\{r_i, j\}$, where $r_i$ is the i-th smallest real value and j is the j-th case. This representation doubles the size of the original data, but transforms the search for the best condition into a sequential loop over the sorted pairs. The expended time for this one-time sort of each attribute is a fixed cost that is almost inconsequential when compared to the overall induction time. Yet, the remaining processing is simple and attuned to a modem sequential processing computer that the computational complexity becomes approximately linear in the number of rules or cases.

Estimating Future Performance

To select the solution with the best predictive performance, decisions must be made about the two key measures of rule size: (a) conjunctive term length and (b) the number of disjuncts. If the goal is data mining, then the best solution can be found by using an independent test set for estimating true error. For applications with lesser data, two adjunct measures are useful in model selection: (a) training error and (b) the percentage of close votes (margins) in correctly classified cases. Unlike voted combinations of large trees, the small size of the rules will often lead to training errors far larger than zero. As described below, the trends for training errors, margins and solution complexity, have an important effect on generality.

Missing Values

A pure DNF rule induction system has strong capabilities for handling missing values. Disjunction can produce overlap and redundancy. If we apply a rule to a case, and a term is not satisfied because one of its conditions has a missing value, the rule may still be satisfied by one of the other disjuncts of the rule. These rules have no special conditions referring to missing values; they look no different than rules induced from data with no missing values. How is this accomplished? For the application of rules, a term is considered not satisfied when a missing value is encountered in a case. During training, the following slight modifications are made to the induction procedures:

When looping to find the best attribute condition, skip cases with missing values.

Normalize error to a base relative to the frequency of all cases.

$$Norm_k = \frac{\sum_{n,all} frq(n)}{\sum_{i,w/o \; missing \; vals} frq(i)} \quad (5)$$

Each feature may have a variable number of missing values. The normalization factor is computed as in Equation 5 for feature k. The normalization factor is the total number of cases, n, including missing values cases, divided by the frequency of cases without missing values. False positives and negatives are computed as in Equations 6 and 7, a straightforward normalization of Equation 4.

$$FP_k = Norm_k \cdot \sum_i FP(i) \cdot frq(i) \quad (6)$$

$$FN_k = Norm_k \cdot \sum_i FN(i) \cdot frq(i) \quad (7)$$

Feature Selection Speedup

In J. Friedman, T. Hastie and R. Tibshirani (1998), supra, a substantial speedup in training was demonstrated by ignoring cases having low weights. Decision trees were induced without these cases, but tested on all cases. If sufficient errors were encountered on the ignored cases, their weights were increased and they were re-admitted to the training sample.

For the lightweight rule induction method of the present invention, the following alternative speedup is also effective: during the first k inductions of rules, record the features that are selected. After the first k rules are induced, ignore all features not selected by the first k rules. If the number of features selected is small relative to the total number of features, the speedup is high. The ignored features are not re-admitted to the pool.

Comparative View of Rule Induction Methods

Table 2 summarizes the different characteristics of methods that improve on classical rule induction by adaptively inducing solutions. SLIPPER and TTI are compared with the lightweight rule induction (LRI) method of the present invention. Disjunction refers to individual DNF rules that are voted as one unit. As will be seen below, some applications require the more complex basis function implied by disjuncts within an individual rule. Some systems have default rules for the largest class, others generate rules for each class. Most adaptive methods weight each rule or each disjunctive rule set. Although TTI and LRI differ significantly in the use of direct rule induction versus small tree induction, LRI has more similarities to TTI than SLIPPER. Yet, the LRI scheme is highly simplified. It produces unweighted rules; the class with the most votes is selected. All classes have the same number of rules. The minimizing function is simply the error and the adaptive function for weighting the case during training uses the simple cumulative error of all previous rules.

TABLE 2

Comparison of High-Performance Rule Induction Methods

|  | SLIPPER | TTI | LRI |
| --- | --- | --- | --- |
| Disjunction | no | yes | yes |
| Pruning | yes | no | no |
| Random Training | yes | no | no |
| Default Rule | yes | no | no |
| Direct goal | rule | tree | rule |
| Rule Size Limit | no | yes | yes |
| Minimizing Function | Z | gini/entropy | error |
| Multi-class | yes | yes | yes |
| Weighted Solutions | yes | yes | no |
| Weighted Cases | yes | yes | yes |
| Adaptive Function | boosted | boosted | cumulative error |
| Number of Rules per Class | unequal | unequal | equal |

Results

To test the efficacy of lightweight rule induction, datasets from the UCI repository, C. Blake, E. Keogh and C. Merz, "UCI Repository of Machine Learning Databases," Technical Report, University of California, Irvine, (1999), were processed. Table 3 summarizes the characteristics of these data. The number of features describes numerical features and categorical variables decomposed into binary features. The principle objective in this comparison is data mining, so datasets were selected having relatively large numbers of training cases and designated test sets. Also included were several non-proprietary datasets described in W. Cohen and Y. Singer (1999), supra. Two noisy datasets are also included (a) noise—a set of random numbers with a 0.3 prior for the smaller class and (b) digit25— the digit dataset with 25% of the feature values randomly set to missing.

TABLE 3

Data Characteristics

| Name | Train | Test | Features | Classes |
| --- | --- | --- | --- | --- |
| adult | 30162 | 15060 | 105 | 2 |
| blackj | 5000 | 10000 | 6 | 2 |
| coding | 5000 | 15000 | 60 | 2 |
| digit | 7291 | 2007 | 256 | 10 |
| digit25 | 7291 | 2007 | 256 | 10 |
| dna | 2000 | 1186 | 180 | 3 |

TABLE 3-continued

Data Characteristics

| Name | Train | Test | Features | Classes |
|---|---|---|---|---|
| isolet | 6238 | 1559 | 617 | 26 |
| led | 5000 | 5000 | 24 | 10 |
| letter | 16000 | 4000 | 16 | 26 |
| move | 1483 | 1546 | 76 | 2 |
| noise | 5000 | 5000 | 20 | 2 |
| satellite | 4435 | 2000 | 36 | 6 |
| splice | 2175 | 1000 | 240 | 2 |
| wave | 5000 | 5000 | 40 | 3 |

LRI has 4 design parameters that affect results: (a) the number of rules per class (b) the number of rules after which feature selection is frozen (c) the maximum length of a rule and (d) the maximum number of disjunctions. For all of the experiments, the length of rules were set to 5 conditions and feature selection was frozen after 50 rules for each class. The number of disjuncts in each rule was varied from 1, 2, 4, 8, 16, where 1 is a rule with a single conjunctive term.

TABLE 4

Comparative Error for Rule sets with 10 Rules

| | Number of Disjuncts per Rule | | | | | | min- | |
|---|---|---|---|---|---|---|---|---|
| Name | 1 | 2 | 4 | 8 | 16 | SLIPPER | tree | SE |
| adult | .158 | .153 | .150 | .152 | .143* | .147 | .145 | .002 |
| blackj | .308 | .283* | .330 | .281 | .612 | .279 | .278 | .004 |
| coding | .331 | .332 | .294 | .292 | .295* | .302 | .337 | .004 |
| digit | .110 | .099 | .091 | .089† | .088* | — | .154 | .008 |
| digit25 | .158 | .142 | .130 | .129† | .114 | — | — | — |
| dna | .161 | .076 | .063 | .051† | .064* | — | .075 | .008 |
| isolet | .078 | .072† | .081 | .083 | .113 | — | .173 | .010 |
| led | .275 | .266 | .284 | .282† | .291* | — | .264 | .006 |
| letter | .215 | .155 | .114 | .089 | .071* | — | .134 | .005 |
| move | .282 | .278 | .255 | .241 | .202* | .239 | .255 | .011 |
| noise | .324 | .317 | .336 | .332 | .339* | — | .298 | .006 |
| satellite | .141 | .128 | .117 | .113 | .116* | — | .146 | .008 |
| splice | .227 | .085 | .050 | .044† | .045* | .059 | .043 | .006 |
| wave | .167 | .158 | .160 | .155† | .162* | — | .231 | .006 |

Also varied were the number of rules to measure the gain in predictive performance as the number of rules increases versus the performance of simpler, but fewer rules. Table 4 summarizes the results for a maximum number of terms from 1 to 16. Also included in the table are the published results of SLIPPER, and the results of selecting the minimum test-error tree from a collection of pruned trees trained by a variation of CART, a decision tree program based on L. Breiman, J. Friedman, R. Olshen and C. Stone, "Classification and Regression Trees" (Wadsworth, Monterrey, Calif. 1984), applied solely to the training data. The "SE" column indicates the standard error of the error estimates, where the error estimate±2 standard errors is in 95% confidence. Because the test error was used for finding the minimum error tree, the tree results are somewhat optimistic. Still, for data mining applications, this procedure might be quite reasonable ("Classification and Regression Trees", supra). The standard error is computed for the error of the minimum tree. An asterisk ("*") next to an LRI entry indicates that it is the minimum training error solution. Although complexity can be increased, LRI does not always decrease its training error. Occasionally, the training error can actually degenerate markedly, e.g. the blackjack data. A dagger ("†") indicates that the entry is a much simpler solution and is within 1% of the minimum training error.

TABLE 5

Comparative Error for Different Number of Rules

| | Number of Disjuncts per Rule | | | | | | Best | |
|---|---|---|---|---|---|---|---|---|
| Name | 25 | 50 | 100 | 250 | 500 | LRI-min | Report | SE |
| adult | .135 | .133 | .133 | .131 | .132 | .131 | .147 | .003 |
| blackj | .273 | .274 | .275 | .276 | .276 | .273 | .278 | .004 |
| coding | .276 | .256 | .251 | .249 | .246 | .246 | .302 | .004 |
| digit | .073 | .073 | .067 | .062 | .060 | .059 | .062 | .005 |
| digit25 | .096 | .088 | .087 | .082 | .082 | 082 | — | — |
| dna | .051 | .046 | .042 | .046 | .045 | .042 | .042 | .006 |
| isolet | .056 | .048 | .049 | .050 | .052 | .048 | .033 | .005 |
| led | .284 | .265 | .263 | .265 | .266 | .263 | .260 | .006 |
| letter | .048 | .043 | .039 | .039 | .040 | .039 | .029 | .003 |
| move | .228 | .205 | .195 | .200 | .195 | .195 | .239 | .011 |
| noise | .318 | .311 | .309 | .305 | .305 | .299 | .300 | .006 |
| satellite | .094 | .093 | .093 | .091 | .092 | .092 | .085 | .006 |
| splice | .042 | .040 | .038 | .039 | .039 | .035 | .043 | .006 |
| wave | .151 | .147 | .149 | .150 | .148 | .142 | .140 | .005 |

Table 5 summarizes the results for inducing varying number of rules for each class. The error listed is for the solution with the minimum training error. Also listed is the global minimum test error for any of the trained solutions. The approximate minimum error found in the literature is also given with its standard error. The "Best Report" column indicates the best reported result in the published literature. For noise, led, and wave, the Bayes error is known. For satellite, this result is cited in T. Dietterich, "An Experimental Comparison of Three Methods for Constructing Ensembles of Decision Trees: Bagging, Boosting and Randomization," *Machine Learning Journal,* 0(0), (2000 in press). For blackj, coding, move and splice, the results cited in W. Cohen and Y. Singer (1999), supra, are used since they were based on similar train-test splits. For adult, the result in W. Cohen and Y. Singer (1999), supra, is used even though it is based on a smaller training set (5000 cases only). For letter, the result is cited in J. Friedman, T. Hastie and R. Tibshirani (1998), supra. For digit and dna, the results are taken from L. Breiman, "Bias, Variance and Arcing Classifiers," Technical Report 460, University of California, Berkeley (1996). For isolet, the results are cited in T. Dietterich and G. Bakri, "Error-correcting output codes: A general method for improving multiclass inductive learning programs," *Proceedings of American Association on Artificial Intelligence*, pp. 572–577 (1991).

Timing Results

Figure 3:
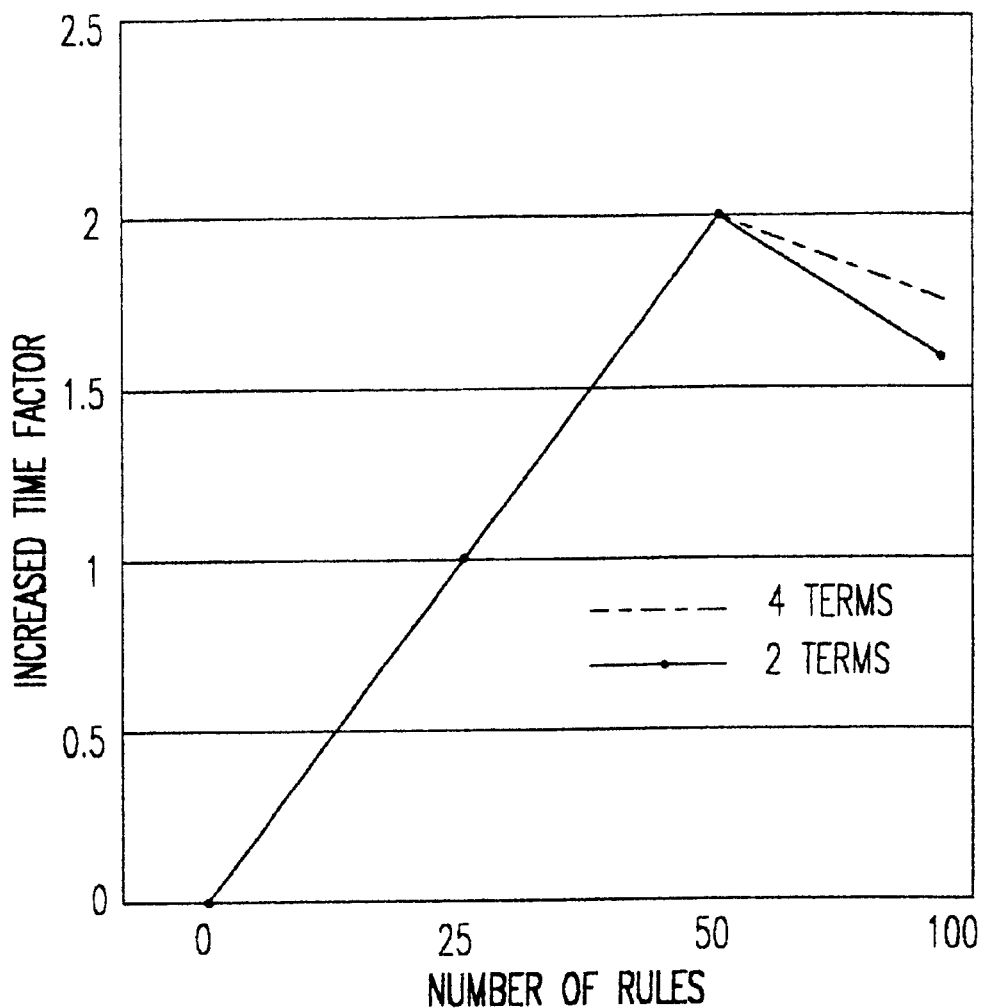
FIG. 3 is a graph showing the timing ratio on doubling the number of rules.

To obtain approximate timings, LRI was trained on the digit data set with 2 and 4 terms. The number of rules was increased from 25 to 50 to 100. To observe the effect of doubling the number of rules, a baseline time for 25 rules was compared to 50 rules, and a baseline time for 50 rules was compared to 100 rules. FIG. 3 summarizes the results. The time almost exactly doubles for an increase from 25 to 50 rules. For 100 rules, the time factor is less than 2 because feature selection is frozen at 50 rules.

Figure 4:
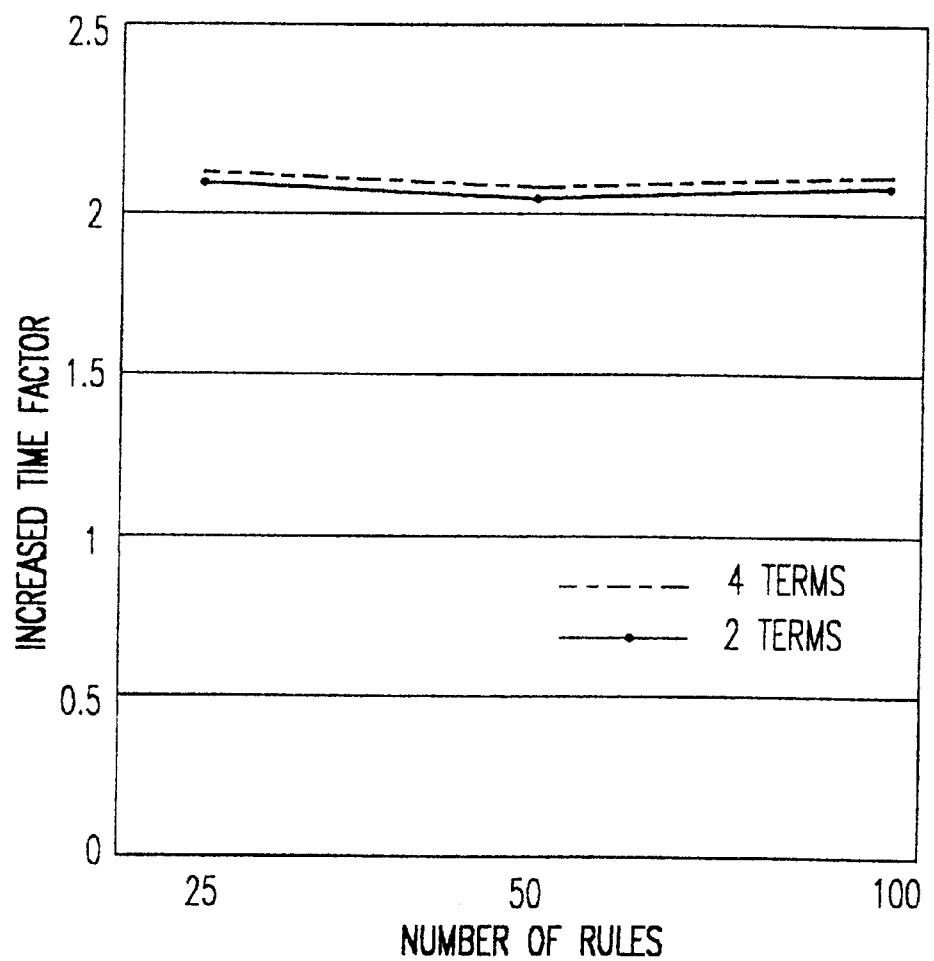
FIG. 4 is a graph showing the timing ratio on doubling the number of cases.

A random sample of 50% was taken from the digit training data, and timings were made for training both the full sample and the half-sample. FIG. 4 summarizes the results. In all variations, a doubling of the number of cases takes approximately twice the time for the same number of rules.

Discussion

Lightweight Rule Induction has a very simple representation: pure DNF rules for each class. It is egalitarian, each class has the same number of rules of approximately the same-size rules. Scoring is trivial to understand: the class with the most satisfied rules wins.

The method is about as simple as any rule induction method can be. The algorithm is rudimentary, and the C code implementation of the preferred embodiment is less than 300 lines. It produces designer rules, where the size of the rules are specified by the application designer.

The central question is: How well does LRI do on practical applications? For best predictive performance, a number of parameters must be selected prior to running. The focus was on data mining applications, where it can be expected that sufficient tests are available for easy estimation. Thus, results are included that describe the minimum test error. With big data, its easy to obtain more than one test sample, and for estimating a single variable, a large single test set is adequate in practice, L. Breiman, J. Friedman and R. Olshen (1984), supra. For purposes of experimentation, almost all parameters were fixed, except for maximum number of disjuncts and the number of rules. The number of disjuncts is clearly on the critical path to higher performance. As already shown for boosting and all forms of adaptive resampling, most of the gains in performance are achieved with the initial smaller set of classifiers.

How good is predictive performance? For even small numbers of rules, performance is generally superior to its rule induction competitors, some of which only operate on binary classification. When the number of rules is increased, LRI can compete with the best classifiers.

Once the features are pre-sorted, timings suggest that training is nearly linear in most directions. The program merely loops on linear lists for each condition that is added to a rule. Unless the complexity of the solutions changes drastically, adding cases or specifying more rules just lengthens the sorted list or the number of rules. Speedup can also improve on linear performance when only a subset of features are detected as useful during initial training.

Of special interest is the natural capability of pure DNF rules to train and process examples with missing values. The inherent redundancy of disjunction was demonstrated in the digit25 example, where 25% of the feature values were destroyed, yet predictive performance was almost maintained. And most importantly, the solution's rules had no special mention of missing values. The rules look like rules generated without missing values.

The binary classification model requires a separate induction of rules for each class. Although theoretically compensated by parallel and independent processing, separate induction is a drawback for multi-class induction of mutually exclusive classes. One might consider the alternative of inducing small truncated trees using the adaptive scheme of the present invention. This approach was not successful. Ignoring the issues of equality of rule numbers and redundancy, it was found that for unweighted rules, very large trees were needed to match the performance of LRI. Otherwise for smaller trees, coverage of classes was insufficient and could not compete with the faster converging weighted boosting methods.

An extensive number of the large datasets that are freely available for analysis were examined. Some noisy datasets were added, including one with 100% noise. Although there is still some tendency to overfit, the effect seems less than found for boosting, T. Dietterich, (2000), supra, and the results suggest that overfitting is avoidable by testing with varying complexity.

Increasing the margins of votes for correct and incorrect answers has been described as the key mechanism of boosting, R. Schapire, Y. Freund, P. Bartlett and W. Lee, "Boosting the Margin: A New Explanation for the Effectiveness of Voting Methods," *The Annals of statistics*, 26(5), pp. 1651–1686 (1998). LRI directly improves margins of voting in binary classification. In addition to recording training error, the percentage of correct cases with a margin of less than 10% for the second highest vote getter were also recorded. These results were not used directly in the tables of results, but the margin can be very helpful in estimating generalization. For example in the noise application, the training error decreases for increase complexity, yet the margins of correct cases show a marked decrease.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for generating decision rules in disjunctive normal form (DNF) by examining stored examples, also called cases, where a new example is classified by applying all rules and assigning the example to the class with the most satisfied rules, using a specified maximum length of a rule, maximum number of disjuncts and number of rules per class, said method comprising the steps of:

(a) growing a conjunctive term T until the maximum length of a rule is reached or until false negatives (FN) is equal to zero (0) by greedily adding conditions that minimize Err1, wherein $$Err1 = FP + k \cdot FN \ \{\text{where } k=1,2,4 \ldots \text{ and } TP>0\},$$

FP indicates a number of false positives and FN indicates a number of false negatives for a case, and TP indicates true positives, $$FP = \sum_i FP(i) \cdot frq(i), \quad FN = \sum_i FN(i) \cdot frq(i),$$

frq(i) represents a relative frequency of case i, FP(i) is 1 for a false positive in case i and 0 otherwise, and FN(i) is 1 for a false negative in case i and 0 otherwise;

(b) recording T as a next disjunct for rule R, thereby generating a part of induced rule R;

(c) removing cases covered by T, if a quantity of disjuncts generated is less than the specified maximum number of disjuncts and FN is greater than 0 and repeating steps (a)–(c);

(d) evaluating the induced rule R on all training cases i; and (e) updating cumulative error counts e(i) for case i, wherein steps (a) through (e) are repeated for any desired number of rules.

2. A method as recited in claim 1, wherein rules may be induced from data with missing values by skipping a case i having a missing value, further comprising the steps of:

normalizing error $Norm_k$, where normalization for variable k is $$Norm_k = \frac{\sum_{n,all} frq(n)}{\sum_{i,w/o \ missing \ vals} frq(i)},$$

-continued $$FP_k = Norm_k \cdot \sum_i FP(i) \cdot frq(i), \text{ and}$$

$$FN_k = Norm_k \cdot \sum_i FN(i) \cdot frq(i),$$

where frq(n) represents a relative frequency of n cases of all n cases, and frq(i) represents a relative frequency of all i cases without missing values; and applying a rule to a new case, where the rule is satisfied if any single disjunct is satisfied, but a single disjunct is not satisfied when applied to a missing value.

3. A method as recited in claim 1, wherein the relative frequency frq(i) is $\{1=e(i)^3\}$, and e(i) is a cumulative number of errors for case i.

4. A method as recited in claim 1, further comprising the step of pre-processing each example from a complete sample by sorting each variable to produce a paired ordered list of the form $\{r_i, j\}$, where $r_i$ is the i-th smallest real value and j is the j-th case, thereby doubling the size of the original sample data and preparing data in sorted order to find a best threshold for testing a variable.

5. A method as recite in claim 1, wherein two key measures of rule size are considered: (a) conjunctive term length and (b) number of disjuncts.

6. A computer readable medium containing code for generating decision rules in disjunctive normal form (DNF) by examining stored examples, also called cases, where a new example is classified by applying all rules and assigning the example to the class with the most satisfied rules, using a specified maximum length of a rule, maximum number of disjuncts and number of rules per class, the code, when executed on a computer, implementing the steps of:

(a) growing a conjunctive term T until the maximum length of a rule is reached or until false negatives (FN) is equal to zero (0) by greedily adding conditions that minimize Err1, wherein $Err1 = FP + k \cdot FN$ {where $k=1,2,4 \ldots$ and $TP > 0$}, FP indicates a number of false positives and FN indicates a number of false negatives for a case, and TP indicates true positives, $$FP = \sum_i FP(i) \cdot frq(i), \quad FN = \sum_i FN(i) \cdot frq(i),$$

frq(i) represents a relative frequency of case i, FP(i) is 1 for a false positive in case i and 0 otherwise, and FN(i) is 1 for a false negative in case i and 0 otherwise;

(b) recording T as a next disjunct for rule R, thereby generating a part of induced rule R;

(c) removing cases covered by T, if a quantity of disjuncts generated is less than the specified maximum number of disjuncts and FN is greater than 0 and repeating steps (a)–(c);

(d) evaluating the induced rule R on all training cases i; and (e) updating cumulative error counts e(i) for case i, wherein steps (a) through (e) are repeated for any desired number of rules.

7. A computer readable medium as recited in claim 6, wherein rules may be induced from data with missing values by skipping a case i having a missing value, the code further implementing the steps of:

normalizing error $Norm_k$, where normalization for variable k is $$Norm_k = \frac{\sum_{n, all} frq(n)}{\sum_{i, w/o \text{ missing vals}} frq(i)},$$

$$FP_k = Norm_k \cdot \sum_i FP(i) \cdot frq(i), \text{ and}$$

$$FN_k = Norm_k \cdot \sum_i FN(i) \cdot frq(i),$$

where frq(n) represents a relative frequency of n cases of all n cases, and frq(i) represents a relative frequency of all i cases without missing values; and applying a rule to a new case, where the rule is satisfied if any single disjunct is satisfied, but a single disjunct is not satisfied when applied to a missing value.

8. A computer readable medium as recited in claim 6, wherein the relative frequency frq(i) is $\{1+e(i)^3\}$, and e(i) is a cumulative number of errors for case i.

9. A computer readable medium as recited in claim 6, the code further implementing the step of pre-processing each example from a complete sample by sorting each variable to produce a paired ordered list of the form $\{r_i, j\}$, where $r_i$ is the i-th smallest real value and j is the j-th case, thereby doubling the size of the original sample data and preparing data in sorted order to find a best threshold for testing a variable.

10. A computer readable medium as recited in claim 6, wherein two key measures of rule size are considered: (a) conjunctive term length and (b) number of disjuncts.

11. A system for generating decision rules in disjunctive normal form (DNF) by examining stored examples, also called cases, where a new example is classified by applying all rules and assigning the example to the class with the most satisfied rules, using a specified maximum length of a rule, maximum number of disjuncts and number of rules per class, comprising:

a computing device having memory for storing cases and at least one computer code section;

means for inputting a set of cases for developing decision rules;

a first code section in said memory implementing the steps for (a) growing a conjunctive term T until the maximum length of a rule is reached or until false negatives (FN) is equal to zero (0) by greedily adding conditions that minimize Err1, wherein $Err1 = FP + k \cdot FN$ {where $k=1,2,4 \ldots$ and $TP > 0$}, FP indicates a number of false positives and FN indicates a number of false negatives for a case, and TP indicates true positives, $$FP = \sum_i FP(i) \cdot frq(i), \quad FN = \sum_i FN(i) \cdot frq(i),$$

frq(i) represents a relative frequency of case i, FP(i) is 1 for a false positive in case i and 0 otherwise, and FN(i) is 1 for a false negative in case i and 0 otherwise;

(b) recording T, in said memory, as a next disjunct for rule R, thereby generating a part of induced rule R;

(c) removing cases, from said memory, covered by T, if a quantity of disjuncts generated is less than the specified maximum number of disjuncts and FN is greater than 0 and repeating steps (a)–(c);

(d) evaluating the induced rule R on all training cases i; and (e) updating cumulative error counts e(i) for case i, wherein steps (a) through (e) are repeated for any desired number of rules; and means for outputting the induced Rule R recorded in the recording step (b) implemented by the first code section.

12. A system as recited in claim 11, wherein rules may be induced from data with missing values by skipping a case i having a missing value, further comprising a second code section implementing the steps of:

normalizing error $Norm_k$, where normalization for variable k is $$Norm_k = \frac{\sum_{n,all} frq(n)}{\sum_{i,w/o\ missing\ vals} frq(i)},$$

$$FP_k = Norm_k \cdot \sum_i FP(i) \cdot frq(i), \text{ and}$$

$$FN_k = Norm_k \cdot \sum_i FN(i) \cdot frq(i),$$

where frq(n) represents a relative frequency of n cases of all n cases, and frq(i) represents a relative frequency of all i cases without missing values; and applying a rule to a new case, where the rule is satisfied if any single disjunct is satisfied, but a single disjunct is not satisfied when applied to a missing value.

13. A system as recited in claim 11, wherein the relative frequency frq(i) is $\{1+e(i)^3\}$, and e(i) is a cumulative number of errors for case i.

14. A system recited in claim 11, further comprising a second code section implementing the step of pre-processing each example from a complete sample by sorting each variable to produce a paired ordered list of the form $\{r_i,j\}$, where $r_i$ is the i-th smallest real value and j is the j-th case, thereby doubling the size of the original sample data and preparing data in sorted order to find a best threshold for testing a variable.

15. A system as recited in claim 11, wherein two key measures of rule size are considered: (a) conjunctive term length and (b) number of disjuncts.

* * * * *